March 1, 1932.   J. M. LARSON   1,847,880
THERMOSTATIC CONTROL
Filed July 25, 1928   3 Sheets-Sheet 1

Inventor:
John M. Larson
Jones, Addington, Ames & Seibold
Att'ys.

March 1, 1932.  J. M. LARSON  1,847,880
THERMOSTATIC CONTROL
Filed July 25, 1928   3 Sheets-Sheet 2
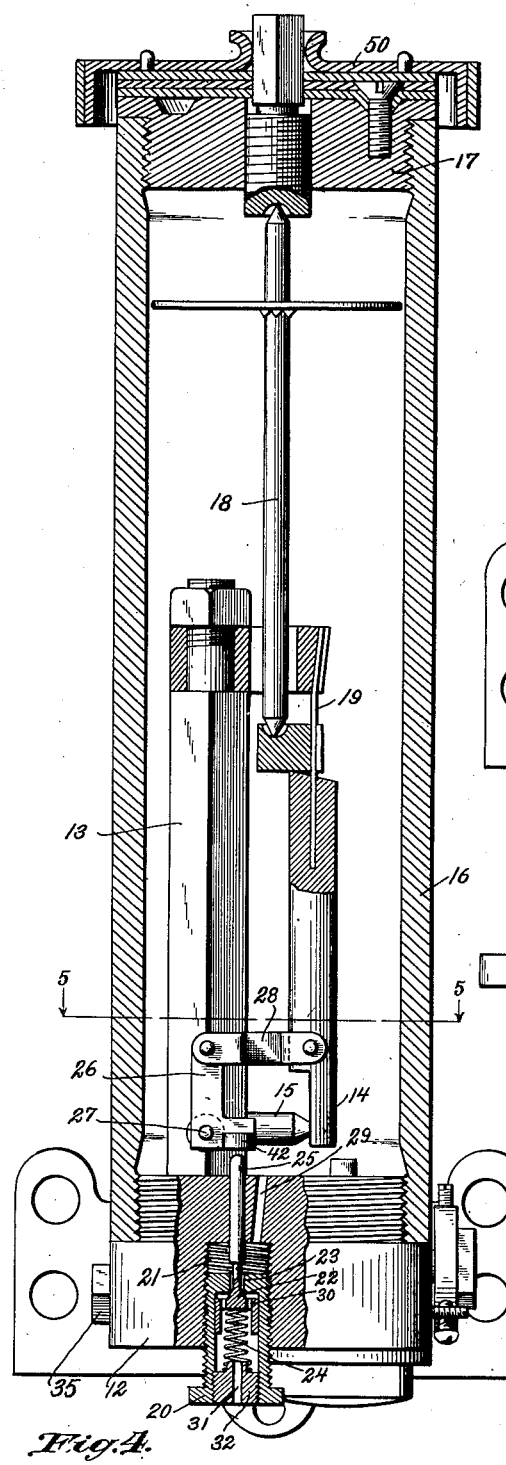
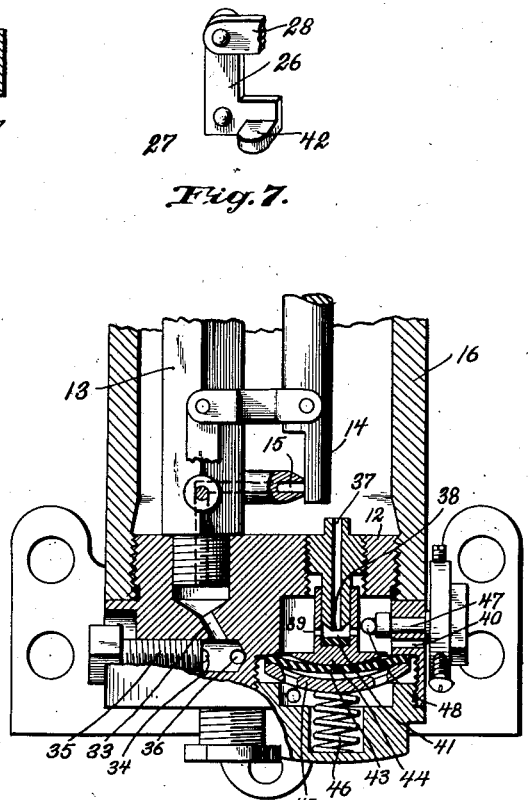
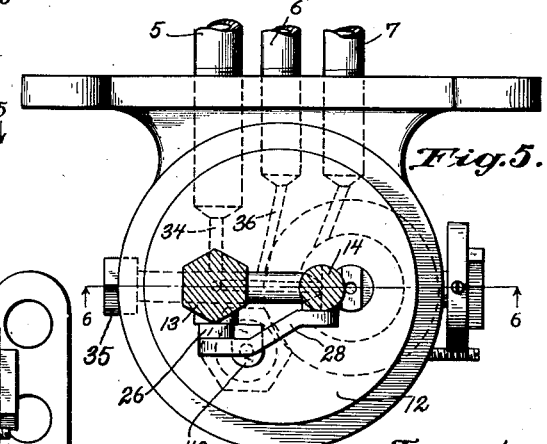
Inventor:
John M. Larson
By Jones, Addington, Ames & Seibold
Att'ys.

March 1, 1932. J. M. LARSON 1,847,880
THERMOSTATIC CONTROL
Filed July 25, 1928 3 Sheets-Sheet 3

Inventor:
John M. Larson
By
Jones, Addington, Ames & Seibold
Att'ys.

Patented Mar. 1, 1932

1,847,880

UNITED STATES PATENT OFFICE

JOHN M. LARSON, OF CHICAGO, ILLINOIS, ASSIGNOR TO NATIONAL REGULATOR CO., OF CHICAGO, ILLINOIS, A CORPORATION OF ILLINOIS

THERMOSTATIC CONTROL

Application filed July 25, 1928. Serial No. 295,170.

My invention relates to a thermostatic control. Among the objects of my invention are to provide a thermostatic controller by means of which a single thermostatic element may be made to maintain either a relatively high temperature or a relatively low temperature;

To provide a thermostatic controller in which the adjustment for the low temperature may be made from the outside of the cage;

To provide a thermostatic controller in which the adjustment for the high temperature may be made from the outside of the cage;

To provide a thermostatic controller in which the valve mechanism for maintaining one of the temperature levels may be removed and reinserted without changing its adjustment;

To provide a thermostatic controller in which a single element may be used to maintain either a high temperature or a low temperature level, and in which a number of such themostatic controllers may be controlled collectively;

To provide a single element high-low temperature controller having means for collective control and means whereby selected ones may be made exempt from the collective control;

To provide a single element high-low temperature controller with collective controls, individual exemption, and automatic restoration to collective control;

To provide a single element high-low temperature controller of such construction that is may be adjusted for the two temperatures while the room temperature remains unchanged.

To provide a high-low single element temperature controller which will enable a graduated control to be had at both temperature levels;

To provide a high-low single element temperature controller in which the valve for maintaining one of the temperature levels may be removed as a unit;

To provide a single element high-low temperature controller in which each thermostat controls two actuators, one in a gradual manner and the other in a positive manner.

Further objects will appear from the description and claims.

In the drawings, in which two forms of my invention are shown;

Fig. 4 is a vertical sectional view of the single element high-low controller used in Fig. 1;

Fig. 5 is substantially a section on the line 5—5 of Fig. 4;

Fig. 6 is a section on the line 6—6 of Fig. 5;

Fig. 7 is a perspective view of a valve actuator used in Fig. 4;

Figure 1:
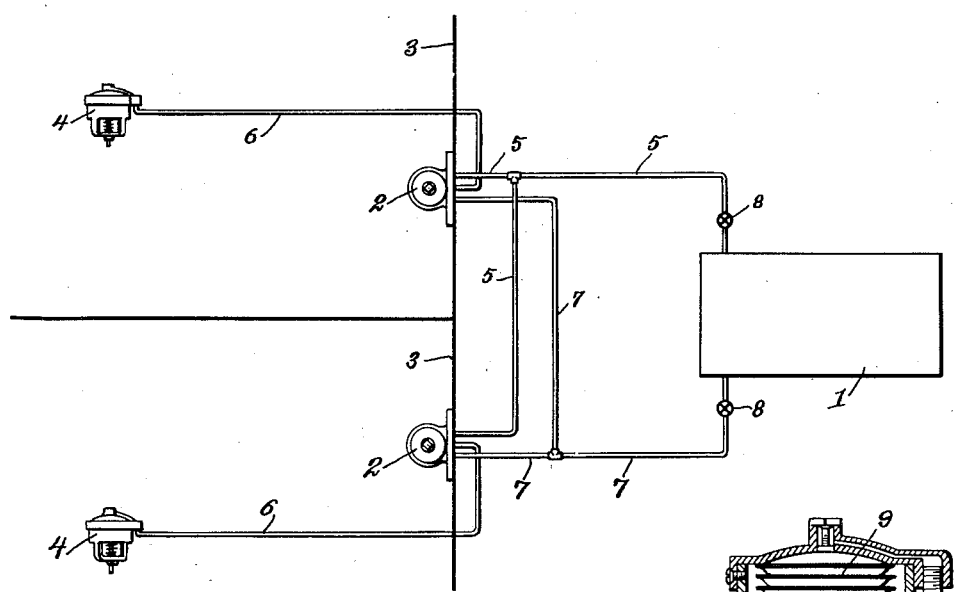
Figure 1 is a diagrammatic view showing a system of single element high-low temperature controllers, each controlling a single actuator.

Referring to the drawings in detail, and first to the construction shown in Figs. 1, 4, 5, 6 and 7, the construction shown herein comprises a compressed air source 1 (Fig. 1), a plurality of high-low temperature controllers 2, usually one for each room 3, a plurality of pneumatic actuators 4, in this instance one for each thermostatic controller, and a system of pipes or conduits associated with the compressed air tank 1, the thermostatic controllers 2 and the power devices 4. Compressed air is supplied to the thermostatic controllers 2 through the conduits 5 and compressed air is supplied from the thermostatic controllers 2 to the pneumatic actuators 4 through the conduits 6. Compressed air for changing the thermostatic control from one temperature level to another is supplied to the thermostatic controllers 2 through the conduits 7. Suitable manually operated valves 8 are provided, one for controlling the supply of compressed air to the thermostatic elements 2 to pass therefrom to the pneumatic actuators 4, and the other valve to control the supply of compressed air to the thermostatic controllers 2 for determining whether high or low temperature is to be maintained.

Figure 3:
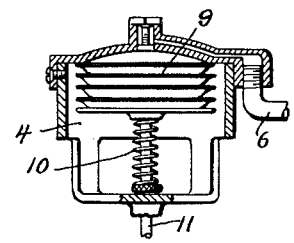
Fig. 3 is a view showing a well known form of power device which may be controlled by the thermostatic controller and which may be used in the systems shown in Figs. 1 and 2.
Figure 2:
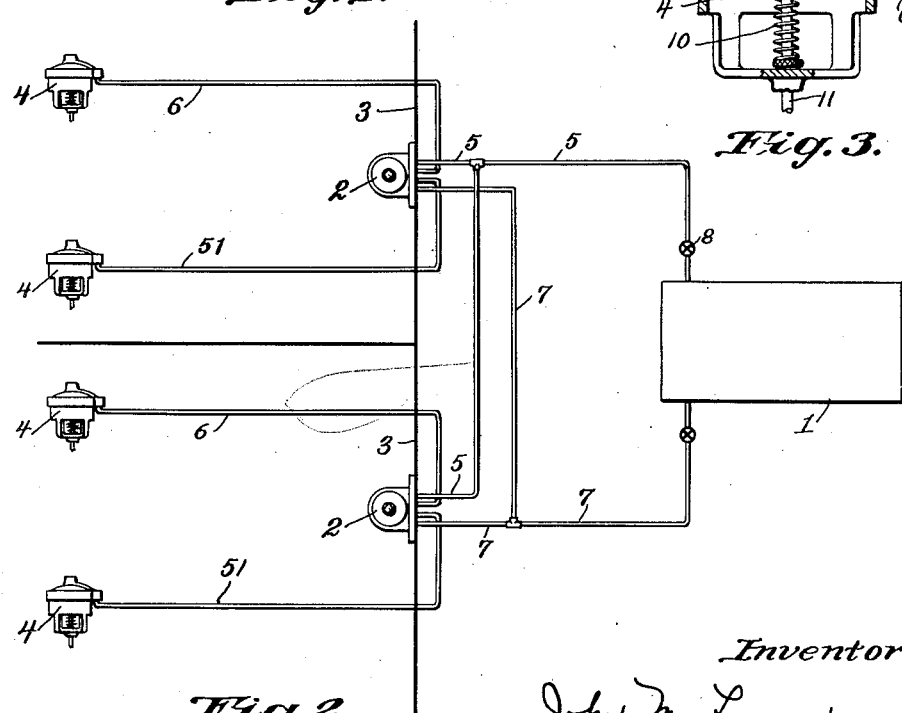
Fig. 2 is a diagrammatic view showing a system of single element high-low temperature controls in which each controller controls two power devices.

The pneumatic actuators 4 may be of any usual or suitable type, and, as shown in Fig. 3, comprises an expansible chamber 9 to which compressed air is supplied from the conduit 6 and from which the air is exhausted through this same conduit. A coil compression spring 10 tends to hold this collapsible chamber in compressed position. A plunger 11 connected with the movable side of the expansible chamber 9 may be used to control a radiator valve or any suitable heat controlling device.

The thermostatic controller itself, shown in detail in Figs. 4, 5, 6 and 7, comprises a base or plug 12 containing various passages and ports and valve mechanisms, a valve post 13 mounted on this plug, a spring mounted valve 14 mounted on this valve post, a port member 15 mounted on the valve post and controlled by the valve 14, a heat extensible cylinder 16 having an air-tight threaded engagement with the plug or base 12, a plug 17 having a screw-threaded air-tight engagement with this heat extensible cylinder, and a push pin 18 extending between the spring mounted valve and the plug.

The valve post 13, valve 14, heat extensible cylinder 16, plug 17, and push pin 18 are of a type well known in this art, and will not be described in detail.

Contraction of the heat extensible cylinder 16 will force the valve 14 away from the port 15 against the tension of the leaf spring 19, and expansion of the heat extensible chamber 16 will permit the valve 14 to seat against the port 15 under the action of its spring 19.

In order that the one heat extensible cylinder 16 may be selectively used to maintain either a high temperature or a low temperature, I provide, in addition to the valve and port construction 14 and 15, a second valve and port construction having a lost motion relation with respect to the valve 14 so that this valve may operate normally to control the port without having any effect on the second valve and port construction. This valve and port construction comprises a plug 20, which is, in effect, a valve casing screwed into a threaded opening 21 in the base plug 12, a valve 22 cooperating with the port 23 in this plug 20, a spring 24 tending to hold this valve 22 against its seat 23, and a push pin or valve stem 25 which may, if desired, be formed integral with the valve 22, and which is in position to be operated by a bell crank lever 26 pivotally mounted at 27 on the valve post 13, this bell crank lever being pivotally connected with the valve 14 by means of a link 28.

The threaded chamber 21 into which the plug 20 is screwed is in communication with the chamber formed by the heat expansible cylinder 16 through a passage 29. When the valve 22 is open air can escape from the chamber in the cylinder 16 through the passage 29, port 23, openings 30 in the valve 22 and passage 31 in the plug 32.

The passage 33 leading to the port 15 is in restricted communication with the source 1 of compressed air through the conduit 5, passage 34 in the base 12 and past the adjustable screw-threaded restricting plug 35. The pneumatic actuator 4 which controls the radiator valve or other heat controlling device is in communication with the passage 33 leading to the port 15 through the conduit 6 and passage 36 in the base plug 12. When the port 15 is completely closed pressure will build up in the pneumatic actuator 4 substantially to the full pressure in the compressed air source 1, and this will fully expand the expansible chamber 9. The pneumatic actuator 4 is so related to the radiator valve or other heat controlling device that expansion of this chamber will cut off the heat. This will prevent further expansion of the expansible tube 16 and eventually will result in a fall in the room temperature, which will cause a contraction of the expansible tube 16 causing the valve 14 to uncover the port 15 and more or less relieve the pressure in the pneumatic actuator 4. The amount to which the pressure in the pneumatic actuator 4 is relieved will depend upon the extent to which the port 15 is uncovered. If the port 15 is completely uncovered so that the air can escape freely, the pressure in the pneumatic actuator 4 will drop almost to atmospheric pressure because of the restriction in the supply passage 34 effected by the restrictive valve or plug 35. If the valve is in some position between completely closed and fully opened, the pressure in the pneumatic actuator 4 will be somewhere between the full pressure in the compressed air source 1 and atmospheric pressure.

Thus the valve 14 cooperating with the port 15 will maintain what is known as a graduated control over the pneumatic actuator 4 as it may cause the pneumatic actuator 4 to expand gradually or contract gradually.

When the valve 14 and port 15 are in control any air exhausted through the port 15 past the valve 14 is allowed to escape through the passage 37 past the port 38 and through the openings 39 and passage 40. When it is desired to shift the control from the port 14 and valve 15 to the other port 23 and valve 22 construction, the valve 41 is raised to close the port 38 so that the air cannot escape from the chamber in the cylinder 16 even when the valve 14 is opened. If the valve 14 and port 15 are thus rendered inoperative, the pneumatic actuator 4 will remain in expanded position and the radiator valve will stay closed and the temperature will continue to fall until the other valve and port construction 22 and 23 is brought into operation. This takes place when the lost motion between the valve 14 and the valve stem 25 has been taken up and the finger 42 on the bell-crank lever 26 engages the upper end of the valve stem 25. Thereafter, further contracting movement of the cylinder 16 will push the valve 22 from its seat and permit the air in the cylinder 16 to escape through the passage 29, port 23 and openings 30 and passage 31. From this stage on the low temperature valve and port construction 22 and 23 will assume control and will control in the same manner as the valve and port construction 14 and 15 control the high level temperature.

For raising the valve 41 as aforesaid to shift from high level temperature to low level temperature control a pneumatic diaphragm 43 is provided on which the button 44 of the valve 41 rests, the lower side of this diaphragm 43 being in communication with the conduit 7 leading from the compressed air supply 1. When compressed air is turned on this diaphragm 43 is raised and the valve 41 is closed thus changing the control from the high level temperature to the low level temperature. The diaphragm 43 is held in place by means of a perforated retainer 45, the annular edge of which is forced against the annular edge of the diaphragm 42 by means of a coil compression spring 46.

By means of the valve 8 all of the temperature controllers 2 may be controlled collectively and may be collectively shifted from high level temperature to low level temperature or vice versa. In order to exempt individual controllers from the collective control if desired, and thus maintain normal high level temperature in any desired room a manually operated rock shaft 47 is provided having a rock arm 48, which in one position of the rock shaft 47 engages the upper side of the button 44 on the valve 41 to hold the valve down against the lifting action of the diaphragm 43. This rock shaft 47 is provided with a weight 49 which normally holds the rock shaft 47 in the position shown in Fig. 6, in which the rock arm 48 is clear of the button 44 on the valve. However, when pressure is on underneath the diaphragm 43 and the rock shaft 47 is turned to bring the rock arm 48 against the upper face of the button 44, the pressure of the upper face of the button 44 against the end of the rock arm is sufficient to hold the rock arm in retaining position against the action of weight 49. However, when the pressure is relieved underneath the diaphragm 43, the weight will restore the rock arm to the position shown in Fig. 6, so that thereafter the valve 41 may be operated by air pressure, if desired.

It will be seen that the valve port and valve construction 22 and 23 for controlling the lower pressure level may be removed as a unit for inspection and cleaning, and that the valve 22, valve spring 24 and retaining plug 32 may be removed from the bushing or valve shell 20 when desired without disturbing the setting of this bushing.

The thermostat may be adjusted to vary the low temperature level simply by screwing the valve casing plug 20 in or out the proper amount. Screwing the plug in will raise the low temperature level and screwing it out will lower it. This adjustment may be made from the outside of the cage or cylinder 16, and without disturbing the adjustment for the high temperature.

Furthermore, the thermostat may be adjusted so that it will give the desired high level temperature and the desired low level temperature and these adjustments may be made while the room temperature remains unchanged.

In order to accomplish this the valve 41 is closed setting the thermostats for low level temperature. The rock arm 48 is then turned to force the valve 41 off its seat. The indicating dial 50 on the top of the thermostat is then turned to a lower temperature than the room temperature so that the valve 14 will cover the port 15 and accumulate pressure to cut off the supply of heat. Thereafter, the indicating dial 50 on the top of the thermostat is turned slowly to "warmer" until the air starts to escape from the port 15. The noise of the escaping air can be heard from the outside of the thermostat. The room temperature is then noted and the dial 50 placed so that it reads the same temperature as the thermometer. This gives the adjustment for high or normal temperature. The rock arm 48 is then moved to releasing position preventing the escapement of air and causing pressure to accumulate in the diaphragm 9 and cylinder 16.

Assuming, for example, that a differential between the high level temperature and low level temperature of 20° is desired and that the high level temperature chosen is 70°, the indicating dial is turned 20° toward "warmer" and the valve casing plug 20 is screwed upwardly until the air begins to escape. The indicating dial 50 is then turned back to the 70° setting and the thermostat is now adjusted for the high level temperature of 70° and the low level temperature of 50°.

The construction shown in Figs. 2, 8, 9 and 10 is similar to that just described, except that here the single element high-low temperature controller is used to control two pneumatic actuators 4 such as shown in Fig. 3, and to control one of them in the graduated manner previously described but to control the other in a positive or quick acting manner. In this construction, the conduits, 5, 6, and 7, correspond in construction and function to the conduits 5, 6, and 7 of the previously described construction, but in addition a fourth conduit 51, is provided which leads from a controller 2 to a pneumatic actuator 4 which is controlled in such a manner that it acts positively and quickly at the critical point. The conduit 51 for this quick acting pneumatic actuator is in communication with the compressed air supply conduit through a passage 52 (Figs. 9 and 10), controlled by the adjustable restricting screw 53, and this quick acting pneumatic actuator 4 is in communication with the exhaust port 54 and the exhaust passage 55 (Fig. 8) through the passage 56. This exhaust port 54 is controlled by a quick acting diaphragm 57 which in one position completely closes the port 54, and in the other position permits free exhaust through the exhaust passage 55. The underside of this diaphragm 57 is controlled selectively by the high low valves 14 and 22 through the passages 58 and 59.

Figure 8:
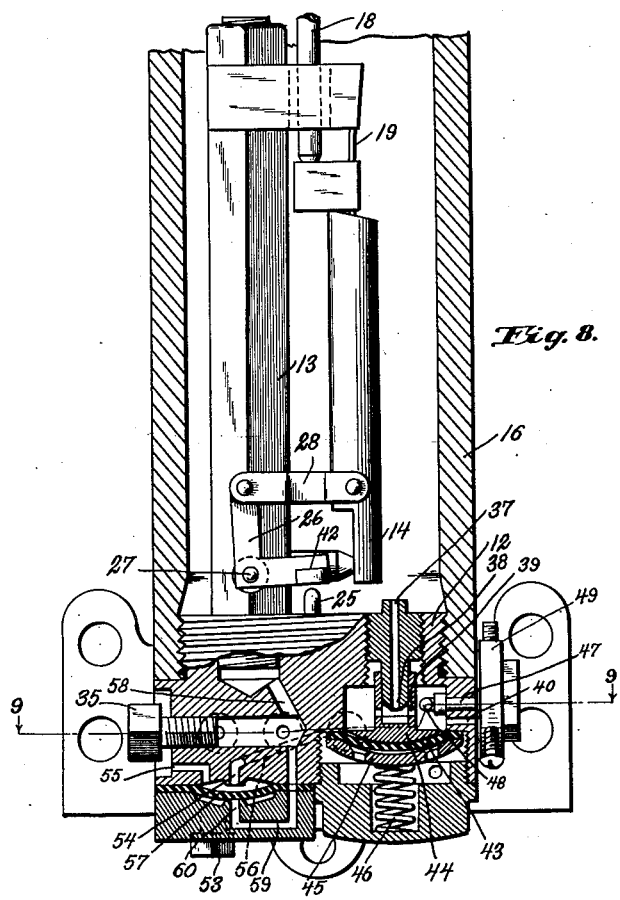
Fig. 8 is a vertical sectional view of a high-low single element temperature controller used in Fig. 2.
Figure 10:
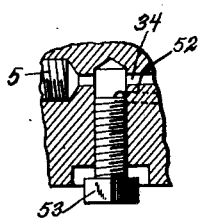
Fig. 10 is a section on the line 10—10 of Fig. 9.
Figure 9:
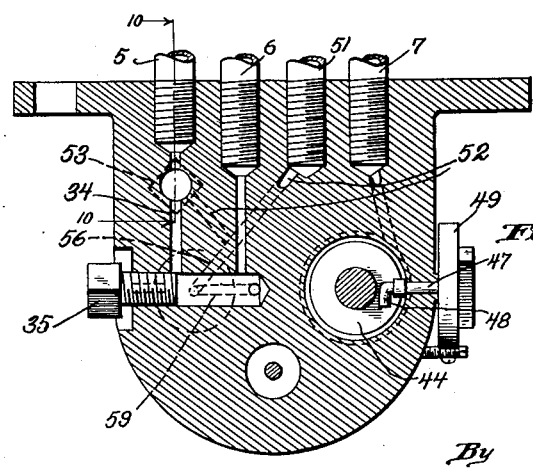
Fig. 9 is a section on the line 9—9 of Fig. 8.

Whenever that one of the valve mechanisms 14 or 22 which is controlling permits air to be exhausted from underneath the diaphragm the diaphragm 57 will remain in its lowered position as shown in Fig. 8 and air can exhaust freely from the pneumatic actuator 4 which will remain collapsed so long as this condition exists.

Whenever that one of the valve mechanisms 14 or 22 which is in control prevents air from escaping from underneath the diaphragm 57 pressure will build up underneath this diaphragm 57 because of the air supplied passed the restricting screw 53 and when this pressure builds up to a certain degree the diaphragm 57 will be forced from its seat 60. As soon as the diaphragm 57 is forced from its seat the whole underside of the diaphragm 57 will be exposed to the pressure of the air which will cause the diaphragm 57 to snap quickly to its uppermost position against the port 54 thus quickly and completely closing this port 54 and causing the pressure to build up quickly in the pneumatic actuator 4 practically to the full pressure in the compressed air supply thus causing a quick positive action of the pneumatic actuator 4.

Assuming that the pressure in the pressure supply tank is 15 pounds above atmospheric and that a pressure of 3 pounds above atmospheric is necessary to move the diaphragm 57 from its seat, when pressure begins to accumulate in the conduit 6 due to one or the other of the thermostatic valves 14 or 22 cuting off the exhaust, the pressure will rise gradually until it reaches approximately the pressure in the pressure supply tank and during this gradual rise of pressure the pneumatic actuator will gradually distend against the pressure of the compression spring causing a gradual closing off of the heating element controlled thereby.

On the other hand, the diaphragm 57 will act quickly at a definite pressure which, as indicated above, may be about 3 pounds above atmospheric. When this diaphragm moves it moves quickly because of the comparatively large area of the diaphragm which is exposed to pressure the instant the diaphragm leaves the small port 60.

As soon as this diaphragm 57 closes the upper port 54 the pressure will rise quickly in the conduit 51 and in the corresponding pneumatic actuator 4 controlled thereby and will cause this pneumatic actuator to close off its heat controlling element quickly.

By the above described construction it will be seen that a single thermostatic element may be made to maintain either a high level temperature or a low level temperature and may be made to maintain either of these levels by means of one pneumatic actuator having a slow graduated action and another pneumatic actuator having a quick positive action.

It will also be seen that the adjustment for both at high level temperature and the low level temperature may be made from outside of the cage or cylinder; that the valve mechanism for maintaining the low level temperature may be removed or reinserted without disturbing the adjustment for the low level temperature; a construction is provided in which a single element is made to maintain either a high level temperature or a low level temperature with provision for collective control and means whereby selected thermostats may be exempt from the collective control and with provision for the automatic restoration of collective control; that the thermostats may be adjusted for the desired high level temperature and the desired low level temperature, while the room temperature remains unchanged.

While I have described but two embodiments of my invention, it is obvious that many modifications therein may occur to those skilled in the art, and I desire, therefore, that my invention be limited only by the scope of the appended claims and by the prior art.

I claim:

1. The combination with a fluid pressure actuator, of thermostatic means for controlling said actuator comprising two exhaust passages for controlling the pressure in the fluid actuator, one for high level temperature and the other for low level temperature, and a common heat controlled element for controlling the flow through both passages.

2. The combination with a fluid pressure actuator, of thermostatic means for controlling said actuator comprising two exhaust passages for controlling the pressure in the fluid actuator, one for high level temperature and the other for low level temperature, valves for controlling the flow through said passages, respectively, and a common heat controlled element for controlling both valves.

3. The combination with a fluid pressure actuator, of thermostatic means for controlling said actuator comprising two exhaust passages for controlling the pressure in the fluid actuator, one for high level temperature and the other for low level temperature, valves for controlling the flow through said passages, respectively, and a common heat controlled element for controlling both valves, said heat controlled element having a lost motion relation with respect to one of said valves.

4. The combination with a fluid pressure actuator, of thermostatic means for controlling said actuator comprising two exhaust passages for controlling the pressure in the fluid actuator, one for high level temperature and the other for low level temperature, valves for controlling the flow through said passages, respectively, and a common heat controlled element for controlling both valves, said heat controlled element having a lost motion relation with respect to one of said valves and means for preventing exhaust through one of said passages, thereby to shift the control to the other exhaust passage.

5. Thermostatic means for controlling a fluid pressure actuator comprising two fluid passages for controlling the pressure in the fluid actuator, one for high level temperature and the other for low level temperature, valves for controlling the flow through said passages respectively, and a common heat controlled element for controlling both valves.

6. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature, and valves for controlling the flow through said passages, respectively, controlled by the expansion and contraction of said chamber.

7. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature, and valves for controlling the flow through said passages, respectively, controlled by the expansion and contraction of said chamber and means accessible for operation from the outside of the chamber for adjusting the high level temperature controlling means.

8. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature, and valves for controlling the flow through said passages, respectively, controlled by the expansion and contraction of said chamber and means accessible for operation from the outside of the chamber for adjusting the low level temperature controlling means.

9. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature and valves for controlling the flow through said passages, respectively, controlled by the expansion and contraction of said chamber, and means accessible for operation from the outside of the chamber for adjusting the high level temperature controlling means and the low level temperature controlling means.

10. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature, and valve devices for controlling the flow through said passages, respectively, controlled by the expansion and contraction of said chamber, one of said valve devices comprising a port member and a valve carried by said port member and controlling said port, said port member having a threaded adjustment to vary its relation to said heat expansible chamber to vary the temperature level maintained by said valve device.

11. Thermostatic means for controlling a fluid pressure actuator comprising a heat expansible chamber, a fluid passage leading to said chamber for the passage of fluid from said actuator to said chamber, two fluid exhaust passages leading from said chamber, one for high level temperature and the other for low level temperature, and valve devices for controlling the flow through said passages, respectively, controlled by the expansion and contraction of said chamber, one of said valve devices comprising a port member and a valve carried by said port member and controlling said port, said port member having a threaded adjustment to vary its relation to said heat expansible chamber to vary the temperature level maintained by said valve device, said valve device being removable from said port member without disturbing the adjustment of said port member.

12. In a heating system the combination with a plurality of selective two-level temperature controlling devices, each device comprising high level temperature controlling means and low level temperature controlling means, and a common heat controlled element for controlling both the high level temperature controlling means and the low level temperature controlling means, of means for selecting the temperature level for said devices collectively and means whereby the devices may be controlled individually independently of the collective control.

13. In a heating system the combination with a plurality of selective two-level temperature controlling devices, each comprising two fluid passages, one for high level temperature control and the other for low level temperature control, valves for controlling the flow through said passages, and a common heat controlled element for controlling both valves, of means for selecting the temperature level for said devices collectively and means whereby the devices may be controlled individually independently of the collective control.

14. In a heating system the combination with a plurality of selective two-level temperature controlling devices, each device comprising high level temperature controlling means and low level temperature controlling means, and a common heat controlled element for controlling both the high level temperature controlling means and the low level temperature controlling means, of means for selecting the temperature level for said devices collectively and means whereby the devices may be controlled individually independently of the collective control and means whereby when the collective control is exercised the devices which were under individual control will be released from individual control.

15. Thermostatic means for controlling a fluid pressure actuator comprising a fluid supply passage for said actuator, two fluid exhaust passages for said actuator, one for high level temperature control and the other for low level temperature control, valves for controlling the flow through said exhaust passages respectively, and a common heat controlled element for controlling both valves.

16. Thermostatic means for controlling a fluid pressure actuator comprising a heat expansible chamber, a fluid supply passage leading to said chamber, two fluid exhaust passages leading from said chamber, one for high level temperature and the other for low level temperature, and valve devices for controlling the flow through said passages, respectively, controlled by the expansion and contraction of said chamber, one of said valve devices comprising a port member and a valve carried by said port member and controlling said port, said port member with the valve carried thereby being removable as a unit from the rest of the thermostatic means.

17. Thermostatic means for controlling two actuators to cause one to act gradually and the other to act quickly, said means comprising selective means for causing said actuators to maintain either a high level temperature or a low level temperature.

18. Thermostatic means for controlling two actuators to cause one to act gradually and the other to act quickly, said means comprising selective means for causing said actuators to maintain either a high level temperature or a low level temperature, said selective means comprising two fluid passages for controlling the pressure in said actuator and a common heat controlled element for controlling the flow through both passages.

19. In a heating system the combination with a plurality of selective two-level temperature control devices, each comprising means for controlling two actuators, to cause one to act gradually and the other to act quickly, said means comprising selective means for causing said actuators to maintain either a high level temperature or a low level temperature, of means for selecting the temperature level for said devices collectively.

20. In a heating system the combination with a plurality of selective two-level temperature control devices, each comprising means for controlling two actuators to cause one to act gradually and the other to act quickly, said means comprising selective means for causing said actuators to maintain either a high level temperature or a low level temperature, of means for selecting the temperature level for said devices collectively, and means whereby the devices may be controlled individually independently of the collective control.

21. In a heating system the combination with a plurality of selective two-level temperature control devices, each comprising means for controlling two actuators to cause one to act gradually and the other to act quickly, said means comprising selective means for causing said actuators to maintain either a high level temperature or a low level temperature, of means for selecting the temperature level for said devices collectively, means whereby the devices may be controlled individually independently of collective control and means whereby when the collective control is exercised the devices which were under individual control will be released from individual control.

22. Thermostatic means for controlling two actuators to cause one to act gradually and the other to act quickly, said means comprising selective means for causing said actuators to maintain either a high level temperature or a low level temperature and having two passages for supplying fluid to said actuators respectively, two exhaust passages for the exhaust from one of said actuators, one for high and one for low temperature, and a third exhaust passage for the exhaust in the other actuator controlled by the exhaust from said first two exhaust passages.

23. Thermostatic means for controlling two actuators to cause one to act gradually and the other to act quickly, said means comprising selective means for causing said actuators to maintain either a high level temperature or a low level temperature, and means for adjusting the low temperature level without changing the high temperature level.

24. Thermostatic means for controlling two actuators to cause one to act gradually and the other to act quickly, said means comprising selective means for causing said actuators to maintain either a high level temperature or a low level temperature and means for adjusting the high temperature level without changing the low temperature level.

25. The combination with a fluid pressure actuator, of thermostatic means for controlling said actuator comprising two exhaust passages, one for high level temperature and the other for low level temperature, valves for controlling said passages, respectively, and a common heat controlled element for controlling the flow through both valves, said heat controlled element having a lost motion relation with respect to one of said valves and means for preventing exhaust through one of said passages, thereby to shift the control to the other exhaust passage, said low temperature exhaust passages when opened providing a passage for the air flow past the high temperature valve, and a readily removable spring for holding the low level temperature valve to its seat whereby when removing the spring the said low level exhaust passage will afford a permanent passage for the air flow past the high temperature valve, whereby the high level temperature will be constantly maintained.

26. Thermostatic means for controlling a fluid pressure actuator comprising two fluid passages for controlling the pressure in said actuator, one for high level temperature and the other for low level temperature, valves for controlling the flow through said passages respectively, and a common heat controlled element for controlling both valves and means for preventing exhaust through one of said passages thereby to shift the control to the other exhaust passage, comprising a pressure actuated device in communication with the fluid pressure supply for the fluid pressure actuator which permits exhaust under normal fluid pressure but prevents exhaust under abnormal fluid pressure.

27. Thermostatic means for controlling a fluid pressure actuator comprising a first port and a first valve for controlling said port, second and third ports both supplied with fluid from said first port, second and third valves for controlling said second and third ports respectively, and a common heat-controlled element for controlling said first and second valves.

28. Thermostatic means for controlling a fluid pressure actuator comprising a first port and a first valve for controlling said port, second and third ports both supplied with fluid from said first port, second and third valves for controlling said second and third ports respectively, and a common heat-controlled element for controlling said first and second valves, said heat-controlled element having a lost motion connection with said second valve.

29. Thermostatic means for controlling a fluid pressure actuator comprising a first port and a first valve for controlling said port, second and third ports both supplied with fluid from said first port, second and third valves for controlling said second and third ports respectively, and a common heat-controlled element for controlling said first and second valves, and means for closing said third valve when desired to cause the flow to be controlled thermostatically by the second valve.

30. The combination with a fluid pressure actuator, of thermostatic means for controlling said actuator comprising two exhaust passages for the escape of fluid from said fluid pressure actuator, one for high level temperature and the other for low level temperature, a common heat controlled element for controlling the flow through both passages, and selective means for preventing exhaust through one of the said passages thereby to shift control to the other exhaust passage.

31. The combination with a fluid pressure actuator, of thermostatic means for controlling said actuator comprising two exhaust passages for the escape of fluid from said fluid pressure actuator, one for high level temperature and the other for low level temperature, valves for controlling the flow through said passages, respectively, a common heat controlled element for controlling both valves, and selective means for preventing exhaust through one of said passages thereby to shift control to the other exhaust passage.

In witness whereof I have hereunto subscribed my name.

JOHN M. LARSON.

CERTIFICATE OF CORRECTION.

Patent No. 1,847,880.                              Granted March 1, 1932, to

JOHN M. LARSON.

It is hereby certified that error appears in the printed specification of the above numbered patent requiring correction as follows: Page 1, line 25, for the misspelled word "themostatic" read thermostatic; page 4, line 66, for "cuting" read cutting; same page, lines 128 and 129, claim 1, and page 5, lines 6 and 7, 16 and 17, 28 and 29, 42 and 43, claims 2, 3, 4 and 5, respectively, strike out the words "controlling the pressure in the fluid actuator" and insert instead the escape of fluid from said fluid pressure actuator; and that the said Letters Patent should be read with these corrections therein that the same may conform to the record of the case in the Patent Office.

Signed and sealed this 26th day of April, A. D. 1932.

(Seal)                                                          M. J. Moore,
                                                            Acting Commissioner of Patents.